United States Patent [19]
Griffin et al.

[11] Patent Number: 5,878,078
[45] Date of Patent: Mar. 2, 1999

[54] PASS-THROUGH MODEM SUPPORTING BOTH ANALOG AND DIGITAL CELLULAR DATA COMMUNICATIONS

[75] Inventors: Lee Daniel Griffin; Carlos E. Vidales, both of Raleigh, N.C.

[73] Assignee: Ericsson Inc, Research Triangle Park, N.C.

[21] Appl. No.: 698,121

[22] Filed: Aug. 15, 1996

[51] Int. Cl.$^6$ .................................................. H04B 1/38
[52] U.S. Cl. ........................................ 375/222; 375/216
[58] Field of Search ................................. 375/222, 219, 375/259, 216; 455/517; 370/522–527; 379/93.09, 93.01

[56] References Cited

U.S. PATENT DOCUMENTS

| | | | |
|---|---|---|---|
| 5,249,218 | 9/1993 | Sainton | 379/93.29 |
| 5,353,334 | 10/1994 | O'Sullivan | 455/557 |
| 5,479,480 | 12/1995 | Scott | 375/216 |
| 5,711,012 | 1/1998 | Bottoms et al. | 375/222 |
| 5,742,639 | 4/1998 | Fasulo et al. | 375/222 |
| 5,784,633 | 7/1998 | Petty | 375/222 |

FOREIGN PATENT DOCUMENTS

| | | |
|---|---|---|
| 0 661 893 | 12/1994 | European Pat. Off. |
| 0 713 343 | 11/1995 | European Pat. Off. |
| WO 95/07595 | 3/1995 | WIPO |
| WO 95/14359 | 5/1995 | WIPO |
| WO 96/03008 | 2/1996 | WIPO |
| WO 96/27963 | 9/1996 | WIPO |

OTHER PUBLICATIONS

PCT Search Report, Apr. 29, 1998, Application PCT/US 97/14270.

*Asynchronous Data & G3 Fax Service Design Analysis*; 1996 AT&T Wireless Services, Inc.; (pp. 3–17).

Primary Examiner—Tesfaldet Bocure
Attorney, Agent, or Firm—Jenkens & Gilchrist, P.C.

[57] ABSTRACT

A protocol processor functionality and a data pump functionality are included in a modem which is configurable in a number of modes of operation to effectuate both analog and digital data communications. When configured for analog data communications either over a telephone line of the wireline telephone network or using an analog capable mobile station of the cellular telephone network, data signals are routed through both the protocol processor functionality and the data pump functionality. The protocol processor is also connected to the mobile station to transmit and receive call supervision signals. When configured for digital data communications using a digital capable mobile station of the cellular telephone network, the data signals by-pass the data pump functionality and are transmitted by the protocol processor functionality along with the call supervision signals. In an alternative embodiment also configured for digital data communications using a digital capable mobile station, the data signals by-pass both the data pump functionality and the protocol processor functionality.

19 Claims, 2 Drawing Sheets

PASS-THROUGH MODEM SUPPORTING BOTH ANALOG AND DIGITAL CELLULAR DATA COMMUNICATIONS

BACKGROUND OF THE INVENTION

1. Technical Field of the Invention

The present invention relates to modulating and demodulating devices (modems) and, in particular, to a modem supporting the transmission of data communications over both an analog and a digital cellular telephone air interface as well as a conventional analog wireline telephone interface.

2. Description of Related Art

Cellular telephone networks support a plurality of calling services. The most commonly recognized and widely used calling service relates to the handling of voice communications to and from the mobile stations of cellular subscribers. Cellular telephone networks further support the provision of data calling services. For example, subscriber asynchronous data communications and facsimile communications are also supported by the cellular telephone network.

Cellular telephone networks utilize a number of different types of air interfaces for handling radio frequency communications between a mobile station and a base station. Historically, cellular communications, both voice and data, have been effectuated over an analog air interface using an analog traffic channel. For data communications, this typically necessitated the placement of a modem between the data terminal equipment and the subscriber mobile station to enable digital data signal transmission over an analog traffic channel of the analog cellular air interface. Recently, however, new capabilities have been provided in implementing a digital air interface for cellular service (see, for example, the TIA/EIA IS-136 Specification). The availability of a digital air interface advantageously obviates the need for implementing the modulation and demodulation functionalities at the mobile station when engaging in a digital data communication. The data terminal equipment in such cases is then connected directly to the mobile station, with the digital data signal carried over a digital traffic channel of the digital cellular air interface (see, the TIA/EIA IS-130 and 135 Specifications).

There may exist instances within the cellular telephone network where a digital traffic channel on the digital air interface may not be available for use. For example, all digital traffic channels may at the time of mobile station access be in use handling the communications of other cellular subscribers. Alternatively, the particular part of the cellular network being accessed may not yet have been upgraded to support digital traffic channels. In such instances, for the subscriber desiring to immediately make or continue with a cellular data communication, a modem must be used between the data terminal equipment and the mobile station. Such a modem, however, should be flexible enough in design to support data communications over a conventional wireline telephone network as well as both the cellular analog and digital air interfaces when necessary and available.

SUMMARY OF THE INVENTION

The present invention comprises a modem having a serially connected protocol processor functionality and a data pump functionality for processing data signals. When configured for analog data communications, the data pump functionality is connected to either a telephone line for analog data signal communication over the wireline telephone network, or to an analog capable mobile station for analog data signal communication over the cellular telephone network. The protocol processor is further connected via a data connection to the mobile station to transmit and receive call supervision signals used in controlling modem and mobile station operation in connection with the data communication. When configured for digital data communications using the mobile station, the protocol processor by-passes the data pump functionality and the digital data signals are then transmitted along with the call supervision signals over the data connection. In an alternative digital embodiment also utilizing the mobile station, the protocol processor controls operation of a multiplexor to by-pass both the data pump and the protocol processor and transmit the digital data signals along with the call supervision signals over the data connection.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
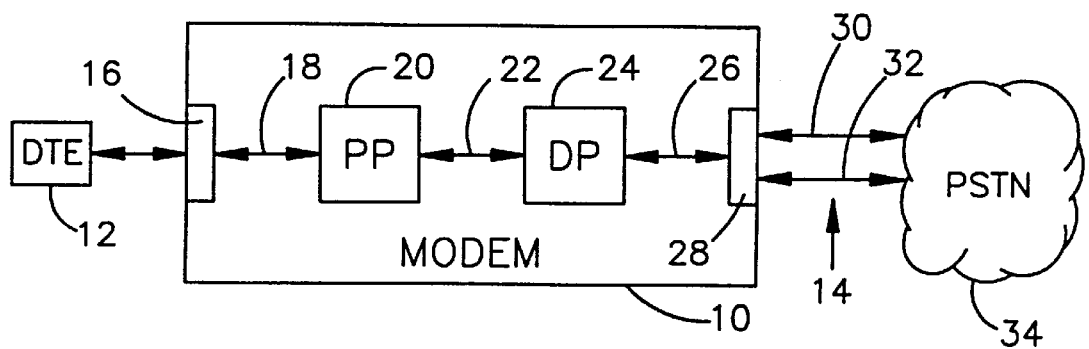
FIG. 1 is a block diagram of a modulator/demodulator (modem) interconnecting data terminal equipment with a conventional analog telephone line.

Reference is now made to FIG. 1 wherein there is shown a block diagram of a modulator/demodulator (modem) 10 interconnecting data terminal equipment 12 with a conventional analog telephone line 14. The modem 10 includes a serial data port 16 that may be connected to any one of a number of data terminal equipment (DTE) 12 devices including, for example, a data terminal (personal computer or laptop). Connected to the data port 16 via connection 18 is a protocol processor (PP) 20 for performing a data formatting and de-formatting function that implements a particular V.X asynchronous communications protocol or equivalent. Specifically, the protocol processor 20 functions to support the Hayes AT modem command set, V.25ter, V.42 and/or V.42bis data/fax services and implement any necessary link protocols for sending and receiving digital data signals. Connected to the protocol processor 20 via a connection 22 is a data pump (DP) 24 that performs the actual modulation and demodulation functions for the modem 10 by means of a digital bit to wave form coding and de-coding operation (e.g., V.34, V.32, V.32bis). Connected to the data pump 24 via connection 26 is a subscriber line interface circuit 28 for making an analog communications connection to the analog telephone line 14 comprising a ring line 30 and a tip line 32 which provide a plain old telephone service (POTS) connection to a public switched telephone network (PSTN) 34.

In a data transmission mode of operation, a serial digital data signal output from the data terminal equipment 12 is received at serial data port 16 and formatted in accordance with the appropriate communications protocol by the protocol processor 20. This formatting operation includes breaking the binary data stream of the digital data signal into sets of bits (or frames). The formatted digital data signal is then modulated by the data pump 24 onto a carrier as a unique combination of carrier phase and amplitude changes, and output as an analog data signal from the subscriber line interface circuit 28 for transmission over the analog telephone line 14. The reverse functional operations take place with respect to analog data signals received by the modem 10 at the subscriber line interface circuit 28. Thus, the phase and amplitude changes in the received analog data signal are first demodulated by the data pump 24, and the signal is then converted (i.e, deformatted) in accordance with the proper protocol by the protocol processor 20 to reconstruct the originally transmitted binary data stream for output from data port 16.

Figure 2:
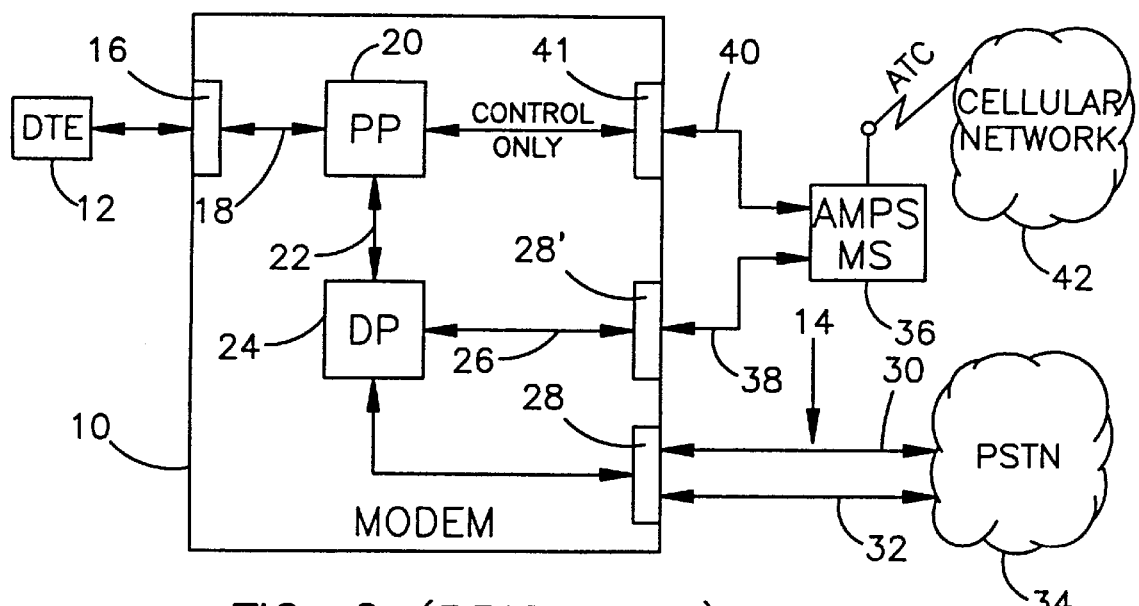
FIG. 2 is a block diagram of a modem interconnecting data terminal equipment with a conventional analog cellular telephone network mobile station.

Reference is now made to FIG. 2 wherein there is shown a block diagram of the modem 10 interconnecting data terminal equipment 12 with a conventional analog cellular telephone network mobile station 36. The serial data port 16 is externally connected to the data terminal equipment 12, and internally connected to the protocol processor 20 via connection 18. The protocol processor 20 performs the data formatting and de-formatting functions of the modem 10. A data pump 24 is connected to the protocol processor 20 via a connection 22. The data pump 24 performs the modulation and demodulation functions of the modem 10. An analog port 28' is connected to the data pump 24 via connection 26. It is through the analog port 28' that the modem 10 makes an analog communications connection 38 to the analog mobile station 36. A digital communications connection 40 is also provided between the mobile station 36 and the protocol processor 20 of the modem 10 through digital port 41. It is over this digital communications connection 40 that control (call supervision) signals are transmitted and exchanged for controlling modem 10 and mobile station 36 operation in connection with the making of a data communication. The mobile station 36 is of a conventional type well known for use in an analog cellular telephone network 42 such as that provided by the advanced mobile phone system (AMPS).

In a data transmission mode of operation, a serial digital data signal output from the data terminal equipment 12 is received at serial data port 16 and formatted in accordance with the appropriate communications protocol by the protocol processor 20. The formatted digital data signal is then modulated by the data pump 24 onto a carrier as a unique combination of carrier phase and amplitude changes, and output as an analog data signal from the analog port 28' for transmission over the analog communications connection 38 to the analog mobile station 36. The analog data signals are then broadcast over the cellular air interface to the cellular telephone network 42. The reverse functional operations take place with respect to analog data signals received by the modem 10 at the analog port 28'. Thus, the phase and amplitude changes in the received analog data signal are first demodulated by the data pump 24, and the signal is then converted (i.e, de-formatted) in accordance with the proper protocol by the protocol processor 20 to reconstruct the originally transmitted binary data stream for output from data port 16.

Figure 3:
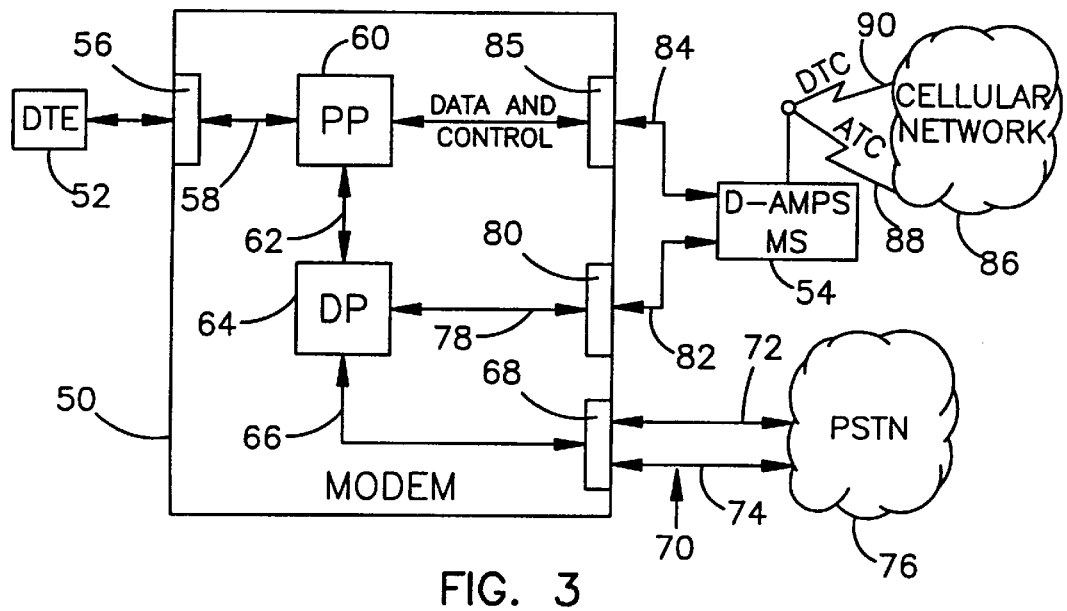
FIG. 3 is a block diagram of a first embodiment of a modem of the present invention interconnecting data terminal equipment with a dual mode cellular telephone network mobile station.

Reference is now made to FIG. 3 wherein there is shown a block diagram of a first embodiment of a modem 50 in accordance with the present invention interconnecting data terminal equipment 52 with a conventional dual mode cellular telephone network mobile station 54. By dual mode it is meant that the mobile station 54 is capable of engaging in radio frequency communications over either an analog cellular air interface (using analog channels) or a digital cellular air interface (using digital channels) of the cellular telephone network. The modem 50 includes a serial data port 56 that may be connected to any one of a number of data terminal equipment (DTE) 52 devices including, for example, a data terminal (personal computer or laptop). Connected to the data port 56 via connection 58 is a protocol processor (PP) 60 for performing a data formatting and de-formatting function that implements a particular V.X asynchronous communications protocol or equivalent. Specifically, the protocol processor 60 functions to support the Hayes AT modem command set, V.25ter, V.42 and/or V.42bis data/fax services and implement any necessary link protocols for sending and receiving digital data signals. Connected to the protocol processor 60 via a connection 62 is a data pump (DP) 64 that performs the actual modulation and demodulation functions for the modem 50 by means of a digital bit to wave form coding and de-coding operation (e.g., V.34, V.32, V.32bis). Connected to the data pump 64 via connection 66 is a first analog port (comprising a subscriber line interface circuit) 68 for making an analog communications connection to an analog telephone line 70 comprising a ring line 72 and a tip line 74 which provides a plain old telephone service (POTS) connection to a public switched telephone network (PSTN) 76. Also connected to the data pump 64 via connection 78 is a second analog port 80 for making an analog data communications connection 82 to the dual mode mobile station 54. A digital data communications connection 84 is also provided between the mobile station 54 and the protocol processor 60 of the modem 50 through digital port 85. It is over this digital data communications connection 84 that control (call supervision) signals are transmitted and exchanged for controlling modem 50 and mobile station 54 operation. The digital communications connection 84 may also be used in the present invention to carry digital data communications to and from the data terminal equipment 52. The mobile station 54 is of a conventional type well known for use in a dual mode cellular telephone network 86 such as that provided by the digital advanced mobile phone system (DAMPS).

The modem 50 may engage in data communications in one of three different modes. First, the modem 50 may effectuate analog data communications with the public switched telephone network 76 using telephone line 70, first analog port 68, data pump 64 and protocol processor 60. Second, the modem 50 may effectuate analog data communications with the cellular telephone network 86 using mobile station 54 (operating in an analog communications mode), analog data communications connection 82, the second analog port 80, data pump 64 and protocol processor 60. Third, the modem 50 may effectuate digital data communications with the cellular telephone network 86 using mobile station 54 (operating in a digital communications mode), digital data communications connection 84, digital port 85 and protocol processor 60. It will be noted that in connection with the third mode of operation, the modem 50 implements a pass-through feature wherein the data signals are passed through the modem without being effected by the modulation and demodulation functionality of the data pump 64. These signals are transmitted (along with the call supervision signals) to and from the mobile station 54 through digital port 85 using the digital data communications connection 84.

Each of the foregoing modes of operation may be better understood by reference to the following data communications example. In connection with each of the modes of operation, a serial digital data signal (binary data stream) output from the data terminal equipment 52 is received at serial data port 56 and formatted in accordance with the appropriate communications protocol by the protocol processor 60. For the first and second modes of operation, the formatted digital data signal is then modulated by the data pump 64 onto a carrier as a unique combination of carrier phase and amplitude changes, and output as an analog data signal from either the first analog port 68 or the second analog port 80. The analog data signal output from the first analog port 68 is transmitted over the analog telephone line 70 to the public switched telephone network (PSTN) 76 in the first mode of operation. The analog data signal output from the second analog port 80 is transmitted over the analog data communications connection 82 to the dual mode mobile station 54 and then transmitted over an analog air interface 88 of the cellular telephone network 86 using an analog traffic channel (ATC) in the second mode of operation. For the third mode of operation, the formatted data signal by-passes the data pump 64 and is output directly by the protocol processor 60 for transmission over the digital data communications connection 84 to the dual mode mobile station 54 and then transmitted over a digital air interface 90 of the cellular telephone network 86 using a digital traffic channel (DTC). The transmission by the protocol processor 60 of the formatted data signal over the digital data communications connection 84 is made in conjunction with (i.e., multiplexed with) the transmission of call supervision signals.

The reverse functional operations take place with respect to analog data signals received by the modem 50 over both the analog telephone line 70 (first mode of operation) and analog data communications connection 82 (second mode of operation), and with respect to digital data signals received by the modem over the digital data communications connection 84 (third mode of operation). For the first and second modes of operation, the phase and amplitude changes in the received analog data signals are first demodulated by the data pump 64, and the demodulated signal is then converted (i.e, de-formatted) in accordance with the proper protocol by the protocol processor 60 to output a binary data stream to the data terminal equipment 52. For the third mode of operation, the protocol processor 60 separates the digital data signals from the call supervision signals also transmitted over the digital data communications connection 84, converts (i.e, deformats) the signals in accordance with the proper protocol, and outputs a binary data stream to the data terminal equipment 52.

The protocol processor 60 also functions to select among the various available modes of operation for the modem 50. The protocol processor 60 identifies when modem 50 has not been connected to a mobile station 54 (using either or both the analog data communications connection 82 and the digital data communications connection 84), and selects the first mode of operation with a connection for data communications transmissions to the public switched telephone network 76 using the analog telephone line 70. When the modem 50 has been connected to both the analog data communications connection 82 and the digital data communications connection 84, the protocol processor 60 selects between the second and third modes of operation and accordingly commands mobile station 54 operation. Specification of the second mode of operation occurs when the dual mode mobile station 54 has accessed an analog traffic channel on the cellular telephone network 86 analog cellular air interface 88 to handle the data communication. Conversely, specification of the third mode of operation when the dual mode mobile station 54 has accessed a digital traffic channel on the cellular telephone network 86 digital cellular air interface 90 to handle the data communication. The protocol processor 60 further functions to specify to the mobile station 54, in advance, the type of traffic channel (either analog or digital) to be used for the data communication.

Figure 4:
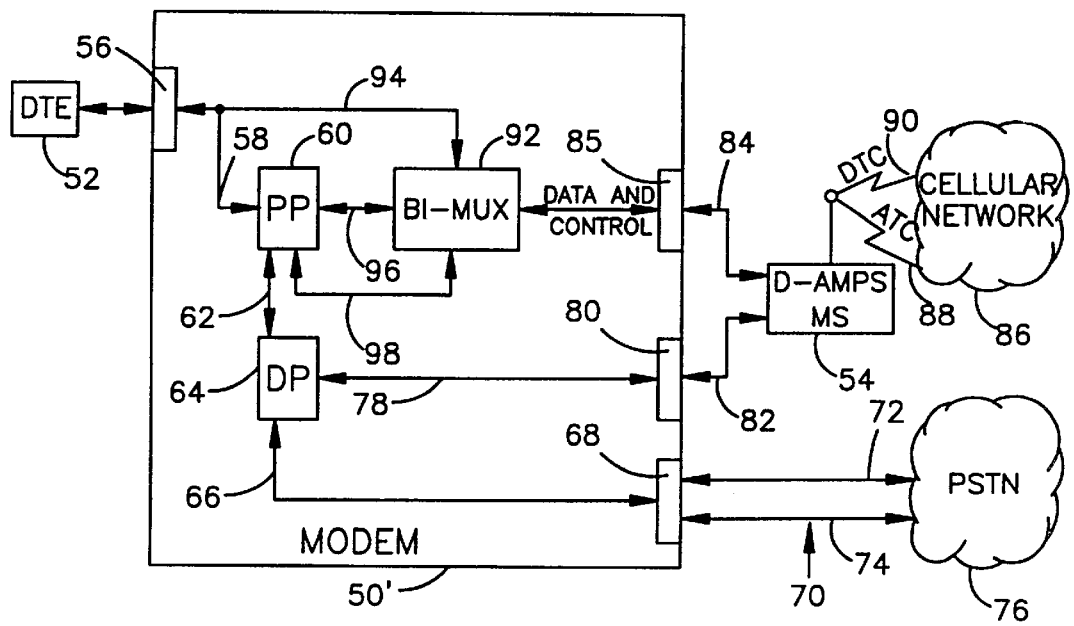
FIG. 4 is a block diagram of a second embodiment of a modem of the present invention interconnecting data terminal equipment with a dual mode cellular telephone network mobile station.

Reference is now made to FIG. 4 wherein there is shown a block diagram of a second embodiment of the modem 50' in accordance with the present invention interconnecting data terminal equipment 52 with a conventional dual mode cellular telephone network mobile station 54. The serial data port 56 is externally connected to the data terminal equipment 52, and internally connected to the protocol processor 60 via connection 58. The protocol processor 60 performs the data formatting and de-formatting functions of the modem 50'. A data pump 64 is connected to the protocol processor 60 via a connection 62. The data pump (DP) 64 performs the modulation and demodulation functions of the modem 50'. A first analog port (comprising a subscriber line interface circuit) 68 is connected to the data pump 64 via connection 66. It is through the first analog port 68 that the modem 50' makes an analog communications connection to an analog telephone line 70 comprising a ring line 72 and a tip line 74 providing a plain old telephone service connection to a public switched telephone network 76. A second analog port 80 is also connected to the data pump 64 via connection 78. It is through the second analog port 80 that the modem 50' makes an analog data communications connection 82 to the dual mode mobile station 54. The modem 50' further includes a bi-directional multiplexer (BI-MUX) 92 connected via first data link 94 to the serial data port 56, and via second data link 96 to the protocol processor 60. A control link 98 is also present between the bi-directional multiplexer 92 and the protocol processor 60. A digital data communications connection 84 is provided between the mobile station 54 and the bi-directional multiplexer 92 through a digital port 85. It is over this digital data communications connection 84 that control (call supervision) signals are transmitted and exchanged for controlling modem 50' and mobile station 54 operation. The digital communications connection 84 is also used with data links 94 and 96 to carry digital data communications to and from the data terminal equipment 52. The bi-directional multiplexer 92 functions to multiplex and de-multiplex the digital data communications and call supervision signals transmitted over the digital communications connection 84.

The modem 50' may engage in data communications in one of four different modes. First, the modem 50' may effectuate analog data communications with the public switched telephone network 76 using telephone line 70, first analog port 68, data pump 64 and protocol processor 60. Second, the modem 50' may effectuate analog data communications with the cellular telephone network 86 using mobile station 54 (operating in an analog communications mode), analog data communications connection 82, the second analog port 80, data pump 64 and protocol processor 60. Third, the modem 50' may effectuate digital data communications with the cellular telephone network 86 using mobile station 54 (operating in a digital communications mode), digital data communications connection 84, digital port 85, multiplexer 92, second data link 96, and protocol processor 60. Fourth, the modem 50' may effectuate digital data communications with the cellular telephone network 86 using mobile station 54 (operating in a digital communications mode), digital data communications connection 84, digital port 85, multiplexer 92, and first data link 94. It will be noted that in connection with the third and fourth modes of operation, the modem 50' implements a pass-through feature wherein the data signals are passed through the modem without being effected by (at least) the modulation and demodulation functionality of the data pump 64. These signals are transmitted (multiplexed with the call supervision signals) to and from the mobile station 54 using the digital data communications connection 84.

Each of the foregoing modes of operation may be better understood by reference to the following data communications example. In connection with the first, second and third modes of operation, a serial digital data signal (binary data stream) output from the data terminal equipment 52 is received at serial data port 56 and formatted in accordance with the appropriate communications protocol by the protocol processor 60. For the first and second modes of operation, the formatted digital data signal is then modulated by the data pump 64 onto a carrier as a unique combination of carrier phase and amplitude changes, and output as an analog data signal from either the first analog port 68 or the second analog port 80. The analog data signal output from the first analog port 68 is transmitted over the analog telephone line 70 to the public switched telephone network 76 in accordance with the first mode of operation. The analog data signal output from the second analog port 80 is transmitted over the analog data communications connection 82 to the dual mode mobile station 54 and then transmitted over an analog air interface 88 of the cellular telephone network 86 using an analog traffic channel (ATC) in accordance with the second mode of operation. For the third mode of operation, the formatted data signal by-passes the data pump 64 and is output directly by the protocol processor 60 over the second data link 96 to the multiplexer 92 for transmission over the digital data communications connection 84 to the dual mode mobile station 54 through digital port 85. For the fourth mode of operation, no formatting of the data signal is performed by the protocol processor 60. Instead, the data signal is sent over first data link 94 (by-passing both the protocol processor 60 and the data pump 64) to the multiplexer 92 for transmission over the digital data communications connection 84 to the dual mode mobile station 54 through the digital port 85. The data signals received by the mobile station 54 in the third and fourth modes of operation are then transmitted over a digital air interface 90 of the cellular telephone network 86 using a digital traffic channel (DTC). In connection therewith, the data signals transmitted over the digital data communications connection 84 are transmitted by the multiplexer 92 in conjunction with the call supervision signals.

The reverse functional operations take place with respect to analog data signals received by the modem 50' over both the analog telephone line 70 (first mode of operation) and analog data communications connection 82 (second mode of operation), and with respect to digital data signals received by the modem over the digital data communications connection 84 (third and fourth modes of operation). For the first and second modes of operation, the phase and amplitude changes in the received analog data signals are first demodulated by the data pump 64, and the demodulated signal is then converted (i.e, de-formatted) in accordance with the proper protocol by the protocol processor 60 to output a binary data stream to the data terminal equipment 52. For the third and fourth modes of operation, the multiplexer 92 separates the digital data signals from the call supervision signals also transmitted over the digital data communications connection 84. In the third mode of operation, the protocol processor 60 then converts (i.e, de-formats) the signals received on second data link 96 in accordance with the proper protocol, and outputs a binary data stream to the data terminal equipment 52. In the fourth mode of operation, however, the signals are directly output as a binary data stream to the data terminal equipment 52 using first data link 94 and thus bypassing the protocol processor 60.

The protocol processor 60 also functions to select among the various available modes of operation for the modem 50'. The protocol processor 60 identifies when the modem 50' has not been connected to a mobile station 54 (using either or both the analog data communications connection 82 and the digital data communications connection 84), and selects the first mode of operation with a connection for data communications transmissions to the public switched telephone network 76 using the analog telephone line 70. When the modem 50' has been connected to both the analog data communications connection 82 and the digital data communications connection 84, the protocol processor 60 selects between the second, third and fourth modes of operation and commands mobile station 54 operation. Specification of the second mode of operation occurs when the dual mode mobile station 54 has accessed an analog traffic channel on the cellular telephone network 86 analog cellular air interface 88 to handle the data communication. Conversely, specification of the third or fourth modes of operation occurs when the dual mode mobile station 54 has accessed a digital traffic channel on the cellular telephone network 86 digital cellular air interface 90 to handle the data communication. Responsive to the accessing of a digital traffic channel on the cellular telephone network 86 digital cellular air interface 90 and a DTE signaling that formatting and deformatting functions do not need to be performed, the protocol processor 60 may signal the multiplexer 92 over control link 98 and switch the modem 50' from the third to fourth mode of operation to utilize the by-pass provided by the first data link 94 and carry the data signals directly between the mobile station 54 and the data terminal equipment 52. The protocol processor 60 further functions to specify to the mobile station 54, in advance, the type of traffic channel (either analog or digital) to be used for the data communication.

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A modem, comprising:
    a serial data port for connecting to data terminal equipment communicating using digital data signals;
    a protocol processor, connected to the serial data port, for formatting and de-formatting the digital data signals;
    a data pump, connected to the protocol processor, for modulating the formatted digital data signals to output analog data signals, and also demodulating received analog data signals to output formatted digital data signals;
    a first analog data port, connected to the data pump, for connecting to an analog port of a cellular telephone network mobile station;
    a digital data port for making a digital data connection between the protocol processor and the cellular telephone network mobile station, the digital data connection carrying both said formatted digital data signals and call supervision signals; and the protocol processor further responding to received call supervision signals to control modem operation in a first mode to route formatted digital data signals between the mobile station and the data terminal equipment through the data pump, and also control modem operation in a second mode to route formatted digital data signals between the mobile station and the data terminal equipment through the digital data connection along with the call supervision signals by-passing the data pump.

2. The modem as in claim 1 wherein the mobile station supports cellular communications over an analog air interface over which the analog data signals are carried in conjunction with the first mode of modem operation.

3. The modem as in claim 1 wherein the mobile station supports cellular communications over a digital air interface over which the formatted digital data signals are carried in conjunction with the second mode of modem operation.

4. The modem as in claim 1 wherein the mobile station comprises a dual mode mobile station operable in an analog mode when the modem is operating in the first mode of modem operation, and further operable in a digital mode when the modem is operating in the second mode of modem operation.

5. The modem as in claim 1 further including a second analog data port, connected to the data pump, for connecting to an analog telephone line of a wireline telephone network, the protocol processor further controlling modem operation in a third mode to route formatted data signals between the analog telephone line and the data terminal equipment through the data pump.

6. A modem, comprising:

a serial data port for connecting to data terminal equipment communicating using digital data signals;

a protocol processor, connected to the serial data port, for formatting and de-formatting the digital data signals;

a data pump, connected to the protocol processor, for modulating the formatted digital data signals to output analog data signals, and also demodulating received analog data signals to output formatted digital data signals;

a first analog data port, connected to the data pump, for connecting to an analog port of a cellular telephone network mobile station;

a multiplexer;

a digital data port for making a first digital data connection between the multiplexer and the cellular telephone network mobile station, the first digital data connection carrying both digital data signals and call supervision signals;

a second digital data connection between the multiplexer and the serial data port carrying digital data signals;

a control data connection between the multiplexer and the protocol processor carrying data and call supervision signals; and the protocol processor further responding to received call supervision signals to control modem operation in a first mode to route formatted data signals between the mobile station and the data terminal equipment through the data pump, and also control modem operation and the multiplexer in a second mode to route data signals between the mobile station and the data terminal equipment through both the first digital data connection, along with the call supervision signals, and through the second digital data connection by-passing the data pump.

7. The modem as in claim 6 wherein the mobile station supports cellular communications over an analog air interface over which the analog data signals are carried in conjunction with the first mode of modem operation.

8. The modem as in claim 6 wherein the mobile station supports cellular communications over a digital air interface over which the digital data signals are carried in conjunction with the second mode of modem operation.

9. The modem as in claim 6 wherein the mobile station comprises a dual mode mobile station operable in an analog mode when the modem is operating in the first mode of modem operation, and further operable in a digital mode when the modem is operating in the second mode of modem operation.

10. The modem as in claim 6 further including a second analog data port, connected to the data pump, for connecting to an analog telephone line of a wireline telephone network, the protocol processor further controlling modem operation in a third mode to route formatted data signals between the analog telephone line and the data terminal equipment through the data pump.

11. The modem as in claim 6 further including:

a third digital data connection between the processor and the multiplexer; and the processor further responding to received call supervision signals to control modem operation in another mode to route formatted data signals between the mobile station and the data terminal equipment through both the first digital data connection, along with the call supervision signals, and through the third digital data connection.

12. The modem as in claim 11 wherein the mobile station comprises a dual mode mobile station operable in an analog mode when the modem is operating in the first mode of modem operation, and further operable in a digital mode when the modem is operating in either the second or the another mode of modem operation.

13. A modem, comprising:

means for making a serial data connection with a data terminal equipment which communicates using digital data signals;

a data pump for modulating the data terminal equipment transmitted digital data signals to output analog data signals, and also demodulating received analog data signals to output digital data signals to the data terminal equipment;

means for making a first analog data connection with a cellular telephone network mobile station to carry the analog data signals;

means for making a digital data connection with the cellular telephone network mobile station to carry both digital data signals and call supervision signals; and a processor responsive to received call supervision signals for controlling modem operation in a first mode to route data signals between the mobile station and the data terminal equipment through the data pump, and for also controlling modem operation in a second mode to route data signals between the mobile station and the data terminal equipment through the digital data connection, along with the call supervision signals, by-passing the data pump.

14. The modem as in claim 13 wherein the mobile station supports cellular communications over an analog air interface over which the analog data signals are carried in conjunction with the first mode of modem operation.

15. The modem as in claim 13 wherein the mobile station supports cellular communications over a digital air interface over which the digital data signals are carried in conjunction with the second mode of modem operation.

16. The modem as in claim 13 wherein the mobile station comprises a dual mode mobile station operable in an analog mode when the modem is operating in the first mode of modem operation, and further operable in a digital mode when the modem is operating in the second mode of modem operation.

17. The modem as in claim 13 further including means for making a second analog data connection with an analog telephone line of a wireline telephone network, the processor further controlling modem operation in a third mode to route data signals between the analog telephone line and the data terminal equipment through the data pump.

18. The modem as in claim 13 further including:

a multiplexer connected to the means for making a digital data connection with the cellular telephone network mobile station;

a first digital communications link between the means for making a serial data connection with the data terminal equipment and the processor;

a second digital communications link between the means for making a serial data connection with the data terminal equipment and the multiplexer;

a third digital communications link between the processor and the multiplexer;

wherein the multiplexer is controlled in the second mode of modem operation to route the data signals through the processor via the first and third digital communications links; and the processor further responsive to received call supervision signals for controlling the multiplexer and modem operation in another mode to route data signals between the mobile station and the data terminal equipment through both the digital data connection, along with the call supervision signals, and through the second digital communications link.

19. The modem as in claim 18 wherein the mobile station comprises a dual mode mobile station operable in an analog mode when the modem is operating in the first mode of modem operation, and further operable in a digital mode when the modem is operating in either the second or the another mode of modem operation.

* * * * *